Dec. 17, 1935.  W. HEMINGWAY, JR  2,024,641
GEAR SHIFT LOCK
Filed Feb. 12, 1934
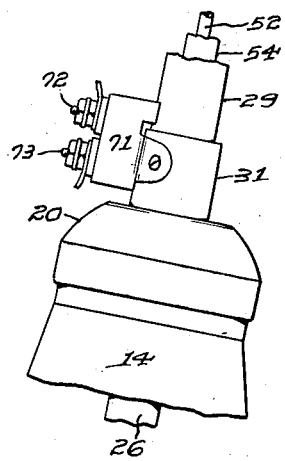
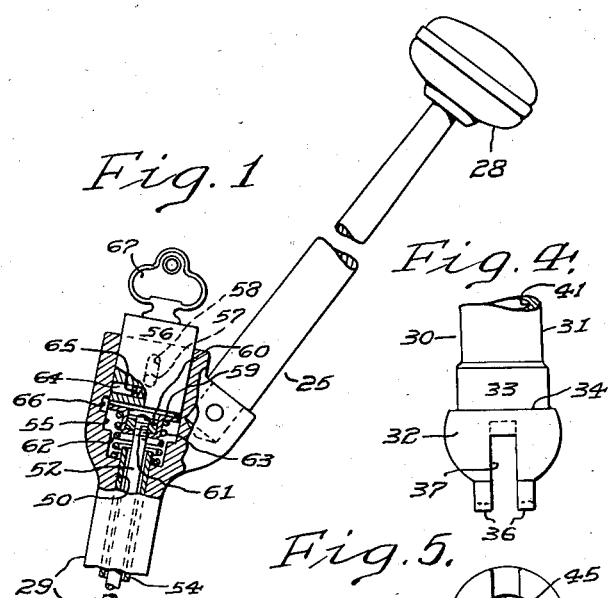
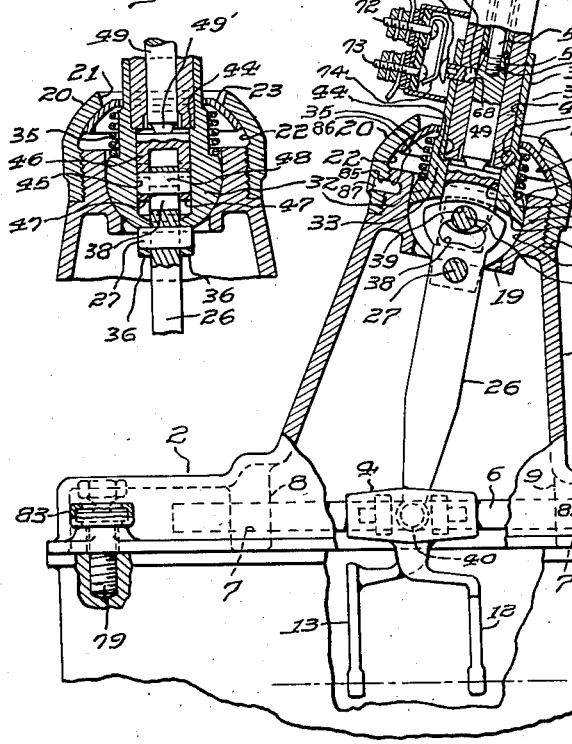
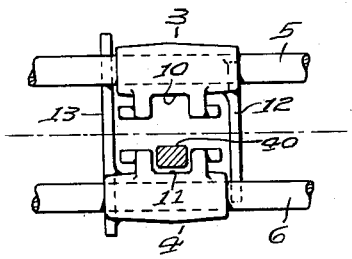
INVENTOR
Wilson Hemingway, Jr.
WITNESS
F. J. Hartman.
BY
ATTORNEY Patented Dec. 17, 1935

2,024,641

UNITED STATES PATENT OFFICE 2,024,641

GEAR SHIFT LOCK

Wilson Hemingway, Jr., Philadelphia, Pa., assignor to The Electrolock Manufacturing Company, Vicksburg, Miss., a corporation of Mississippi Application February 12, 1934, Serial No. 710,879

4 Claims. (Cl. 70—128)

The present invention relates to locks for automobiles and more particularly to a locking mechanism by the operation of which the act of shifting gears cannot be performed or accomplished so long as the mechanism is locked.

An object of the present invention is to provide a construction by means of which an unauthorized person, without a key to unlock the lock cylinder, finds it impossible to shift the gears which are concealed within the housing comprising the gear casing, because the fingers or yokes of the shifting mechanism are also enclosed in said casing and because, when locked, the gear shifting lever is then no longer a stiff rigid lever, but a jointed member, the upper end of which is free to be moved in any direction to the full extent of its normal movement without having any effect whatever on the lower end which engages the forks on the shifting elements or carriages which slide the gears longitudinally of their shafts when the gears are shifted from one position to another in the changing of gearing to the operation of a car.

A further object of my invention is to provide a construction wherein the gear shifting lever is made of two parts which are coupled together into a rigid fixed relationship with respect to each other when and so long as the car is unlocked, and are automatically uncoupled from their rigid relationship when and so long as the car is locked.

A further object of this invention is to provide a mechanism simultaneously operated with the locking of the gear shift of a car, to interrupt or break the ignition circuit, and to reinstate or close the ignition circuit when and so long as the gear shift is unlocked.

A further object of this invention is to provide a construction wherein it is substantially impossible for an unauthorized party to remove the cover or closure of the transmission casing, in which cover the gear shift lever is pivotally mounted, within the limits of time set by the underwriters, by using bolts, the polygonal heads of which break off when the bolts are screwed home, leaving only a cylindrical head on the bolt, when in place, which head affords no surface adapted to the engagement thereof with a Stillson or other similar wrench, and in which even such supplemental heads are enclosed in the freely rotatable caps or closures to make it the more difficult to grip the supplemental head sufficiently firmly to enable such a one to remove the bolts.

Other objects of this invention will appear in the specification and claims below.

Referring to the drawing forming a part of this specification and in which the same reference characters are employed throughout the various views to designate the same parts, Fig. 1 is a side elevational view, partly in vertical cross-section illustrating a gear shift lever embodying this invention;

Fig. 2 is a side elevational view of a portion of the gear shift lever and the switch casing mounted thereon;

Fig. 3 is a vertical cross-sectional view taken on the axis of the gear shift lever at right angles to the position shown in Fig. 1;

Fig. 4 is a side elevational view of the ball section showing the slot and the ears depending from the surface of the ball and the pins;

Fig. 5 is a bottom plan view of the construction shown in Fig. 4;

Fig. 6 is an end elevational view of the lower end of the plunger; and

Fig. 7 is a plan view of the gear shifting elements which are engaged by the lower end of the gear shift lever in shifting the gears from low to reverse and from first to second speeds and then from second to high speed. This fragmentary view of these elements is for the purpose of making the operation of my invention clear, but my invention is equally adaptable to almost any other gear shift elements operating on a four-position gear shift mechanism.

In the drawing I have represented only so much of the gear transmission casing 1 and parts contained therein, as are necessary to a full understanding of the invention. The cover or closure 2 of the transmission casing 1 may be of any suitable design. In it are mounted the two complemental gear shifting elements 3 and 4, respectively, secured to the shafts 5 and 6, which in turn are longitudinally slidable in bearings 7 in the lugs or ribs on the underside of the cover 2. The gear shifting elements 3 and 4 are respectively provided with opposed notches or recesses 10—11 into which the lower end or toe of the gear shifting lever may be successively and alternately moved, as is usual in the shifting of gears, and as will be referred to again below. The elements 3 and 4 are respectively provided with depending yokes 12 and 13 which, in operation, fit into the grooves of the slidable gears (not shown) of the gear changing mechanism.

The cover 2 is also provided with an integral housing or casing 14 which preferably tapers upwardly and terminates in an externally threaded cylindrical head 15 providing a shoulder 16. The head 15 is provided with an axial passage 17—18—19 therethrough, the upper end 17 of which is cylindrical and is of larger diameter than the cylindrical lower open end 19 between which is an intermediate portion 18 which provides a spherical seat when the lower end of the passage forming the stationary spherical surface of a ball-and-socket joint, similar to those with which gear changing levers are usually provided.

Threaded over the head 15 is a cap 20 having an opening 21 through the top thereof, the inner surface 22 of which is spherical. The center of said spherical surface is coincident with the center of the spherical seat 18 in the housing 14. Within the cap 20 is a washer 23 adapted to fit closely around the gear shifting lever and having its outer surface fitting the spherical surface 22 of the cap when the parts are assembled in the manner shown in Fig. 1.

The gear shift lever 24 as shown in Fig. 1, consists in general, of two relatively rigid members pivotally connected together by a pivot pin 27 passing through said members 25 and 26, the axis of said pivot pin being above and substantially parallel to the plane of the axes of the shafts 5—6 and extending at right angles to the direction of the axes of the shafts 5—6.

The upper member 25 includes the handle 28, the upper reach 29 of the lever 24 and the ball section 30.

The ball section 30 comprises, generally, a cylindrical sleeve 31 terminating at its lower end in a substantially hemispherical head or ball 32 of larger diameter than the lower end 33 of the sleeve 31 to provide a shoulder 34 between the ball 32 and the lower end 33 of the sleeve 31. The spherical or hemispherical head 32 fits against the spherical seat 18 in the housing when the parts are assembled and it is retained firmly therein by the pressure exerted by the coil compression spring 35, surrounding the lower end 33 of the sleeve and compressed between the shoulder 34 on the upper side of the ball and the inner surface of the spherical washer 23, which in turn, fits the spherical undersurface 22 of the cap 20.

From the lower surface of the ball 30 extending downwardly, are two spaced lugs or ears 36—36, disposed on opposite sides of the axis of said cylindrical sleeve 31, and the outer surface of said lugs is preferably cylindrical, as is clearly shown in Fig. 5. The slot 37 between said ears 36 is cut axially of the cylindrical outer surface of said ears and extends throughout the length of said ears and rather deeply into the ball 32 to a point beyond the center thereof, as is clearly shown in Figs. 1 and 4. The pivot pin 27 passes through said ears and through the upper end of the lower member 26 of said lever 24. The upper end of said lower member 26 fits between said ears 36 and extends up into the slot 37 in said ball to a point near the wall of said slot, and the upper end of said lower member 26 is preferably provided with an arcuate slot 38, the upper wall of which is provided with a substantially semi-spherical notch or recess, the purpose of which will be referred to again below.

The lower end of said lower member 26 terminates in a somewhat cylindrical toe 40 which, when the gear shift lever 24 is rigid and operative, may be moved transversely with respect to the direction of the travel of the gear shift elements 3 and 4 to bring the lower end of the lever selectively into one or the other of the notches 10 and 11, and, when in a selected notch, to move the gear shifting element 3 or 4 forwardly or rearwardly. Above the section 33 of the cylindrical sleeve 31 is the upper section 41 and the said sleeve is preferably provided with a cylindrical bore 42 within which fits the lower end of the reach 29. It is retained in said socket by a cross-pin or key 43 with its lower end resting squarely on the seat 44.

The bore 45 is of a little less diameter than the bore 42 in the upper end of the sleeve and extends downwardly into the ball 32 quite deeply, but not through the ball, to provide a guideway for a cylindrical head 46 longitudinally slidable therein, the lower end of said head being split or tapered to form downwardly extending ears 47 between which smoothly fits the upper end of the lower member 26 of the gear shift lever 24. The ears 47 are provided with a cylindrical cross-pin 48 passing through suitable openings in the ears and adapted to fit into the notch or recess 39 when the sections 25 and 26 of the gear shift lever 24 are in operative condition. The upper end of the head 46 is integrally connected to a stem 49 of smaller diameter than the head 46 and fitting into the lower end of the bore 50 extending axially of the upper reach 29 of the lever. Between the head 46 and the stem 49 is a rather deep cut groove 49' to make a frangible connection between the heads 46 and 49, should a thief bend the upper reach in an attempt to break the mechanism which renders the reach inoperative to shift the gears.

The upper end of the head 49 is provided with an upwardly tapered section 51 and is rigidly connected to a lower end of a rod 52 as by a screwthread 53. This rod extends upwardly inside of a bushing 54 forced into the bore 50 and frictionally retained therein. Its lower end is above the path of movement of the upper tapered end 51 of the stem 49, as will appear from the description of the operation below.

The upper end of the reach 29 is provided with an open ended cylindrical chamber 55 for the reception of a lock barrel or outer lock cylinder 56 which fits therein. A pin 57 through the wall of the chamber 55 and a slot 58 in the surface of the barrel 56, and extending longitudinally thereof, provide limits to the longitudinal movement and prevent rotary movement of the barrel 56 within the chamber 55.

To the lower or inner end of the barrel 56 is rigidly secured a short cylindrical casing 59 extending downwardly therefrom and within which is slidingly fitted a head 60 secured to the upper end of the rod 52 by screw-threads 61, the upper end of the rod 52 passing freely through the axial opening into the casing 59. Below the chamber 55 is a chamber 62 of somewhat smaller diameter, for the reception of a compression spring 63 seated on the bottom of the chamber 62 and pressing outwardly against the lower end of the barrel 56, thus tending to maintain the barrel 56 in its outermost unlocked position, as shown in Fig. 1. Preferably, the upper end of the bushing 54 extends a short distance into the chamber 62 and the upper end of the spring 63 preferably surrounds the cylindrical portion of the casing 59, and, in this manner, the ends of the spring 63 are fixedly retained in operative position.

The lock cylinder or barrel 56 is provided with a bolt 64 which is continually pressed outwardly radially from the cylinder 56 by a light spring 65 and the inner surface of the chamber 56 is provided with a notch or recess 66 so that when the lock cylinder 56 is manually pressed downwardly into the chamber to the limit of its downward movement, the locking bolt 64 will be in registration therewith and will be impelled by the spring 65 forwardly into said notch 66 thus preventing the withdrawal of the barrel out of its chamber until a key 67 has been inserted into the inner cylinder (not shown) which is mounted within the outer cylinder or barrel 56. Withdrawal of the bolt 64 out of the recess 66 is effected in the manner usually employed with this type of lock; that is to say, the insertion of the key 67 into the inner barrel (not shown) of the lock cylinder 56, withdraws the tumblers (not shown) from their engagement with the outer cylinder or barrel 56 and permit of the rotation of the inner barrel cylinder, which rotation effects the withdrawal of the bolt, such as the bolt 64, into the outer cylinder or barrel 56 against the tension of the light spring 65.

Extending radially through the wall of the upper end of the sleeve 31 and through the wall of the lower end of the reach 29 is a cylindrical hole 68 in which is longitudinally slidable a small plunger 69 having a head 70, of insulating material, on the outer end thereof. This opening 70 is in the vicinity of the tapered end 51 of the head 49. Over said plunger 69 and enclosing the same, is a casing 71 rigidly secured to the cylindrical sleeve 31 and mounting two binder posts 72—73.

Secured to the inner end of one binding post 72 is a resilient leaf-spring contact arm 74, the free end of which spans across to the inner of the other binding post 73 and bears against the insulated head 70 of the plunger 69. This resilient arm 74 forms, with the binding posts 72—73, a make and break switch for the ignition circuit.

It would be futile to provide a device for making it impossible to operate an automobile by locking one of the operating parts of the automobile in an inoperative position could a person, so disposed, remove from the car the locked mechanism in toto in such a manner as to give him access to the parts which were previously rendered inoperative or if it enabled him to remove the locked part and replace it with an unlocked member which would enable him to operate the car. The underwriters' requirements are, generally speaking, that the construction be such that a thief cannot unlock the locked part of the car or replace it with an unlocked portion within a reasonable time, the limits of which are set by the underwriters. It is with this consideration in mind that I have provided what I believe to be a new mode or method of securing the lid or closure with the transmisison gearing of an automobile and in which the gear shift lever is mounted therein and is removable therewith. This improvement consists in bolting said lid or closure 2 to the transmission casing 1 by means of a plurality of bolts 75 sliding through holes or openings 76 in the flange of the casing and threaded into tapped holes 77 in the transmission casing 1, these bolts 75 being of special construction.

The bolts 75, as shown in Fig. 1, comprise a head 78 and a screwthreaded shank 79, the head being polygonal in shape or otherwise adapted to fit and be turned by a suitable wrench or screw turning device. In other words, the heads 75 may be square, pentagonal or hexagonal on the outside surface or, in a recess in the head, or may be slotted for engagement by a suitable strong screwdriver. Between the head and the shank, I provide a supplemental head 80, preferably having a cylindrical outer surface and formed integral with the shank 79. The turning head 78 and the supplemental or permanent head 80 are of integral hard material, but I provide a narrow neck between the turning head and the permanent head by providing a rather deep groove 81, one wall of which is flush with the upper face or surface of the supplemental head 80, and the other wall of which is depressed upwardly toward the turning head 79. The stock of which the bolt 75 is made is strong enough to permit the bolt to be turned by a wrench applied to the head 78 and screwed down sufficiently to firmly hold the lid or cover 2 in place on the casing 1, but the strength of the material is such that having thus screwed the bolts down "home" to permanently retain the lid 2 on the casing 1, the wrench may be given a jerk or pull with sufficient force to snap the material at the deepest point of the groove 81. There being a number of these bolts thus securing the closure 2 to the casing 1, a long time would be required for a burglar to saw slots into the permanent heads 80 deep enough to enable him to use a screwdriver to loosen the bolts and a long time would be required to enable him to drill a hole in the tops of the bolts deep enough to tap a new hole for the insertion therein of a bolt having a reverse screw-thread which would enable him to loosen and remove the shanks 79 from their screwthreaded holes.

But it is possible that the bolts so made might be removed by use of a pipe wrench or a very strong pair of pliers. In view of this, I have provided my bolts with an additional feature which makes it difficult to apply a pipe wrench or pliers thereto to remove them when once set in place. At the end of the shank, I provide a seat 82 of a diameter sufficient to rest square on the upper surface of the cover around the hole or opening 76 and cut away the underside 80' at the periphery of the head 80 to permit of the spinning over and around the head 80 of a loosely fitting cover 83 which, when the seat 82 is firmly held against the top of the flange of the cover 1, permits the lower edge 83' of the cover to rotate freely under the head, the upper flange 83" being spun over the top of the head 80 and the cover 83 being of tough material, such as hardened high speed cutting steel, it would be impossible, or at least it would take a very long time for a thief to remove or cut off these tough, freely revolvable casings or covers to permit him to apply a pipe wrench directly to the heads 80; for these flanged covers 83 would prevent one from compressing the caps with a wrench sufficiently to afford a firm grip on the heads 80 of the screws.

And to prevent a thief from unscrewing the cap 20 and withdrawing the gear shift lever 24 from its housing 14, I make the side walls of the cap smooth and circular or cylindrical and provide the cap with a spanner hole 84 therein so positioned that when the cap 20 is firmly seated on the seat or shoulder 16, the spanner hole 84 will be in alinement with a hole 85 in the head 15 and I then drive into the alined openings a hardened steel pin 86 and headed over smoothly so that the cap 20 may not be removed from the head 15 without first removing the pin 86. But the removal of such pin is in itself a difficult proposition, because I preferably position it in the forward side of the cap 20 and head 15 as they are installed in the car, where it is substantially impossible for a thief to use a hand drill or a breast drill to drill out the pin 86. The tapering head 14 extends upwardly through the floor and the space between the cap and the inclined riser (through which pass the pedals) is insufficient to permit of the use of a hand drill.

Since the cap 20 is made of hard metal and the pin 86 is preferably of hardened steel, it is practically impossible to fit a pipe wrench onto the cap 20 and apply force to it sufficient to shear the pin 86.

Having thus explained the details of the construction of my device, the operation of it will be apparent from the following brief description.

The parts are shown in Fig. 1 in operative position that is to say, the lock cylinder or barrel 56 is in its unlocked outermost position and is held in that position by the resiliency of the spring 63. The rod 52 connected to the barrel 56 through the casing 59 and head 60, is also held in its uppermost position and with it the stem 49 and the head 46 and the cross-pin 48, the latter being seated in the notch 39 of the arcuate slot 38 in the upper end of the lower member 26. In this position, the operator of the car, by grasping the handle 28 may throw the handle and with it the upper reach 29 and the lower section 26 to any position within the limits of the mechanism to bring the toe 40 into the selected groove or notch 10 or 11 in order to throw the selected gear shifting element 3 or 4 forwardly or rearwardly as is usual in operating the gear shifting mechanism of an automobile. The upper member 25 and the lower member 26 are held in rigid unitary relationship because the cross-pin 48 is held firmly in the recess or notch 39 of the arcuate slot 38, thereby locking the upper member 25 to the lower member 26.

To lock the car, one merely withdraws the key 67 and presses the upper end of the lock cylinder 56 downwardly until the locking bolt 64 clicks into the notch or recess 66. This downward movement of the cylinder 56 carries down with it the rod 56 and the parts carried thereby. As the head 46 moves downwardly the cross-pin 48 moving with it, moves out of the recess 39 clear of it into the arcuate slot 38, but this movement of the cross-pin out of the recess 37 virtually disconnected the upper member 25 from the lower member 26 insofar as any rigid operating relationship between them exists. The handle 48 and with it the upper reach 29 may still be moved forwardly or rearwardly or transversely to throw the toe 40 into one or the other of the two nitches or recesses 10 and 11 of the gear shifting elements 3 or 4, but any forward or backward movement of the handle 28 and with it the reach 29 merely causes them and the sleeve 81 with the ball 32 on the end thereof, to rock back and forth on the ball and socket seat 18 in the head 15 without in any wise moving or disturbing in any manner the lower member 26 which is completely housed within the housing 24 and is inaccessible to anyone except by removing the cover 2.

The travel of the cross-pin 48 from the locked position shown in Fig. 1 to its unlocked position in the arcuate slot 38 is, or may be less than the longitudinal travel of the barrel 56 in the chamber 55 in coming from unlocked to locked position and vice versa. When, therefore, the cross-pin 48 comes to rest on the lower edge of the arcuate slot 38, the head 60, in the casing 69, permits a further travel downwardly of the barrel 56 until the top of the head 60 engages or is close to the upper end of the cylindrical casing 69 and, therefore, the cylinder 56, when locked, positively holds the cross-pin 48 at the lower limit of its travel and clear of the notch 39.

But in coming to its lowermost position, the inner end of the little plunger 69, riding down on the tapered surface 31 of the stem 49 under the resilient action of the spring arm 74 with its insulated head 70, is in contact, has permitted the free end of the resilient arm 74 to break its electrical contact with the lower contact point or terminal or binding post 73 thereby breaking the ignition circuit simultaneously with the breaking of the rigid relationship of the upper member 24 with the lower enclosed member 26. In this way the ignition circuit is positively broken when the car is locked and the upper end of the gear shift lever is impotent to operate the lower section 26 to throw the gear shifting elements 3 or 4 backwardly or forwardly to change the gears of the gear changing mechanism.

Having thus described my invention, what I claim and desire to protect by Letters Patent of the United States is:

1. In a transmission lock, the combination with a gear shifting element and a casing in which the same is mounted, concealed and enclosed, of a gear shifting lever having a ball and socket mounting wholly within said casing, said lever comprising an upper member rigid with the ball of said mounting and extending upwardly out of said casing and constituting the handle for operating the lever, and a lower member wholly within said casing and engageable with said shifting element and pivotally connected to said ball, a rod mounted within said upper member and longitudinally reciprocable therein and provided with a pin within said ball, said lower member being provided with a deep recess within which said pin is adapted to fit, yielding means acting on said rod and tending to hold said rod in its uppermost position with said pin fitting in said recess, a lock cylinder mounted in said upper member and permanently connected to said rod and longitudinally slidable within said upper member with said rod, and means to lock said lock cylinder rigidly to the upper section when said cylinder and rod are depressed to the lower limit of their movement against the action of said yielding means, and said pin is clear of said recess.

2. In a transmission lock, the combination with a gear shifting element and a casing in which the same is mounted, concealed and enclosed, of a gear shifting lever having a ball and socket mounting wholly within said casing, said lever comprising an upper member rigid with the ball of said mounting and extending upwardly out of said casing and constituting the handle for operating the lever, and a lower member wholly within said casing and engageable with said shifting element and pivotally connected to said ball, a rod mounted within said upper member and longitudinally reciprocable therein and provided with a transverse pin within said ball parallel to the pivotal connection between said member, said lower member being provided with a slot having a deep recess in a wall thereof within which said pin is adapted to fit, yielding means acting on said rod and tending to hold said rod in its uppermost position with said transverse pin fitting in said recess, a lock cylinder mounted in said upper member and permanently connected to said rod and longitudinally slidable within said upper member with said rod, and means to lock said lock cylinder rigidly to the upper section when said cylinder and rod are depressed to the lower limit of their movement against the action of said yielding means, and said pin is in said slot and clear of said recess in the wall thereof.

3. In a transmission lock, the combination with a gear shifting element and a casing in which the same is mounted, concealed and enclosed, of a gear shifting lever having a ball and socket joint in said casing, said lever comprising an upper member rigid with said ball and extending upwardly out of said casing and constituting the handle for operating said lever and a lower member wholly within said casing and engageable with said shifting element and pivotally connected to said upper member, reciprocable means within said upper member and provided with a transverse pin within said joint and parallel to the pivotal connection between said members, the lower section being provided with a slot having a deep recess in a wall thereof within which said pin is adapted to fit, yielding means acting on said reciprocable means and operative to normally hold said reciprocable means at one of the limits of its movement with said pin fitting said recess, a lock cylinder mounted in said upper member and forming a unitary part of said reciprocable means, and means to lock said cylinder rigidly to said upper section when said cylinder is at one limit of its longitudinal movement and the said pin is clear of said recess in the wall of said slot.

4. A lever comprising in combination an upper member, a lower member, a transverse pivot pin permanently connecting together adjacent ends of said members whereby said members are normally free to move with respect to each other about the axis of said pivot pin, one of said members having a transverse opening providing an arcuate slot concentric with said pivot pin, a wall of said slot having a radial recess therein, the other of said members having a transverse pin passing into said opening, and means to move said transverse pin longitudinally of the member in which it is mounted from said slot into said recess and from said recess into said slot whereby when said transverse pin is in said recess, said members are locked from relative movement about said pivot pin.

WILSON HEMINGWAY, Jr.